(12) United States Patent
Cote, Sr. et al.

(10) Patent No.: US 10,220,990 B2
(45) Date of Patent: *Mar. 5, 2019

(54) CONTAINER SEALING ASSEMBLY

(71) Applicant: Klean Kanteen, Inc., Chico, CA (US)

(72) Inventors: Andrew L. Cote, Sr., Merrimack, NH (US); James Osgood, Chico, CA (US); Philip John Notheis, Chico, CA (US); Eckehart Zimmermann, Monument, CO (US)

(73) Assignee: KLEAN KANTEEN, INC., Chico, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,502

(22) Filed: Nov. 9, 2017

(65) Prior Publication Data

US 2018/0065784 A1 Mar. 8, 2018

Related U.S. Application Data

(63) Continuation of application No. 14/932,836, filed on Nov. 4, 2015, now Pat. No. 9,815,600.

(Continued)

(51) Int. Cl.
*B65D 47/24* (2006.01)
*A47G 19/22* (2006.01)
*A47J 41/00* (2006.01)

(52) U.S. Cl.
CPC ....... *B65D 47/244* (2013.01); *A47G 19/2272* (2013.01); *A47J 41/0022* (2013.01)

(58) Field of Classification Search
CPC .................. B65D 47/244; A47G 19/2272

(Continued)

(56) References Cited

U.S. PATENT DOCUMENTS 2,946,491 A   7/1960   Bramming
5,803,314 A   9/1998   Lester
(Continued)

FOREIGN PATENT DOCUMENTS

EP   0611908 A1   8/1994
JP   2005155676 A   6/2005

OTHER PUBLICATIONS

ISA Korean Intellectual Property Office, International Search Report and Written Opinion Issued in PCT Application No. PCT/US2015/059077, dated Feb. 22, 2016, WIPO, 9 pages.

(Continued)

*Primary Examiner* — James N Smalley
(74) *Attorney, Agent, or Firm* — Alleman Hall Creasman & Tuttle LLP

(57) ABSTRACT

A container sealing assembly is provided. The container sealing assembly includes a cap configured to attach to a container body and a unitary compliant sealing valve movable between a sealed position and an open position and configured to form a sealing interface with the cap when the unitary compliant sealing valve is in the sealed position. One or more seal-breaking structures may be provided to interact in response to a movement of the unitary compliant sealing valve from the sealed position to the open position, where such interaction is configured to break the sealing interface. A compression spring section of the valve may be provided to assist in moving the unitary compliant sealing valve into the open position.

20 Claims, 7 Drawing Sheets

Related U.S. Application Data

(60) Provisional application No. 62/075,190, filed on Nov. 4, 2014.

(58) Field of Classification Search
USPC ....... 220/303, 304, 233–235, 253, 714, 715, 220/254.8, 314
See application file for complete search history.

(56) References Cited

U.S. PATENT DOCUMENTS

| | | |
|---|---|---|
| 6,659,302 B2 | 12/2003 | Lin |
| 6,702,138 B1 | 3/2004 | Bielecki et al. |
| 6,783,020 B2 | 8/2004 | Featherston et al. |
| 2003/0106911 A1 | 6/2003 | Adams et al. |
| 2005/0115977 A1 | 6/2005 | Dibdin et al. |
| 2008/0067466 A1 | 3/2008 | Kobayashi et al. |
| 2009/0159595 A1* | 6/2009 | Michaelian ........ A47G 19/2272 220/260 |
| 2011/0011868 A1 | 1/2011 | Manne et al. |
| 2011/0186766 A1 | 8/2011 | Myhrberg et al. |
| 2011/0309094 A1* | 12/2011 | Bodum .............. A47G 19/2272 220/715 |
| 2012/0043325 A1 | 2/2012 | Williams et al. |

OTHER PUBLICATIONS

European Patent Office, Office Action Issued in Application No. 15857187.7, dated Aug. 30, 2018, Germany, 4 pages.

\* cited by examiner

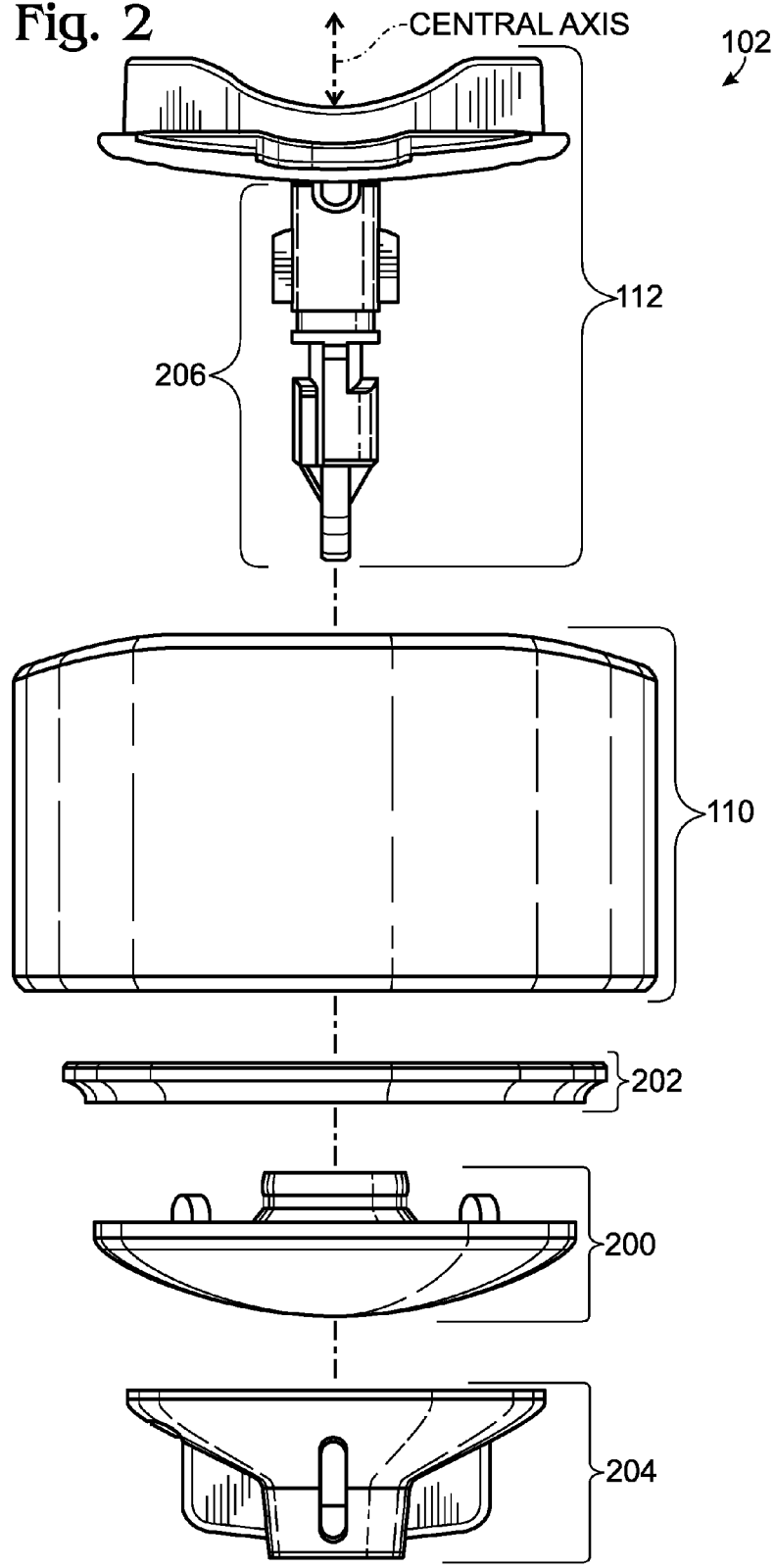

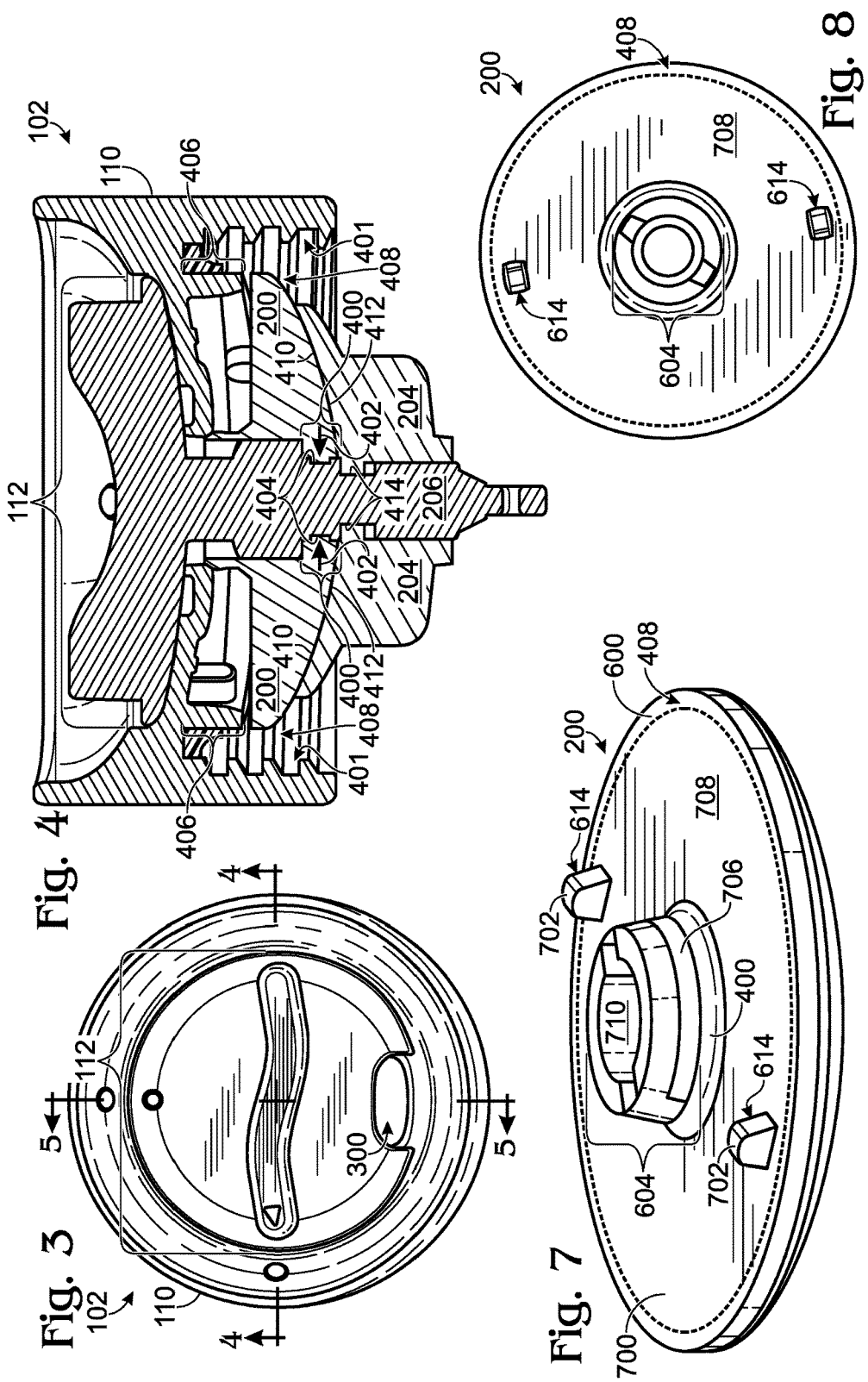

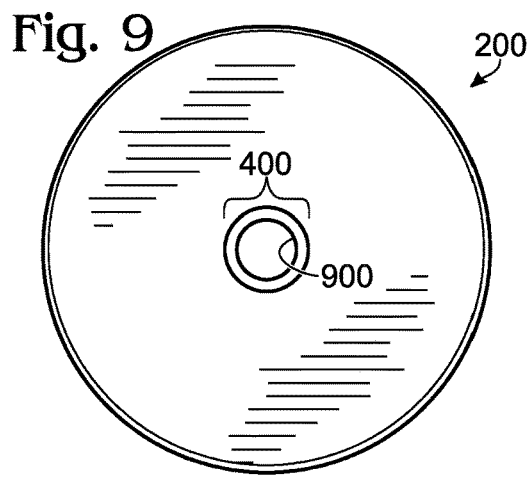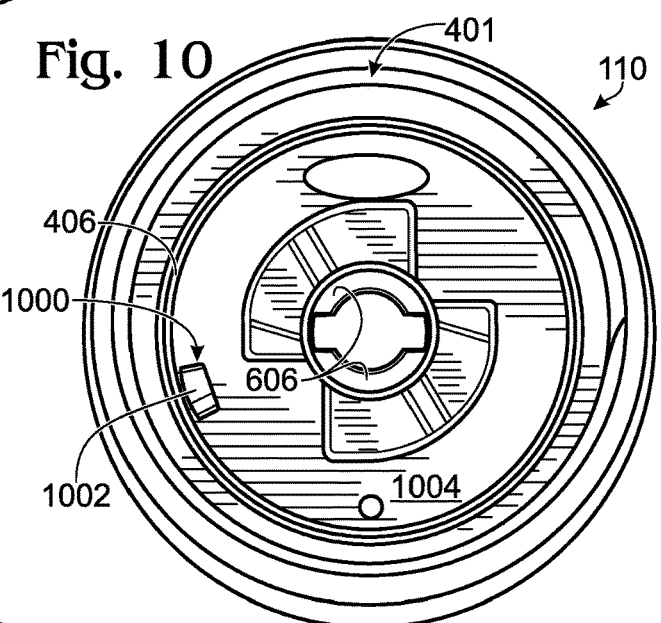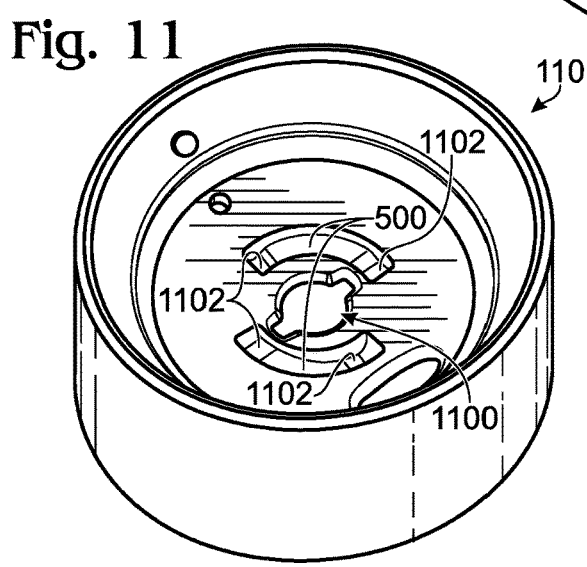

CONTAINER SEALING ASSEMBLY

CROSS REFERENCE TO RELATED APPLICATION

This application is a continuation of U.S. patent application Ser. No. 14/932,836, entitled SEALING CONTAINER ASSEMBLY, filed Nov. 4, 2015, which in turn claims priority to U.S. provisional patent application Ser. No. 62/075,190, entitled SEALING CONTAINER ASSEMBLY, filed on Nov. 4, 2014, the entire disclosures of each of which are hereby incorporated by reference for all purposes.

BACKGROUND

Various sealing mechanisms have been developed to seal water or other liquids within containers. In many applications, the sealing mechanism must account for a range of temperatures, i.e., provide sufficient sealing for both cold and hot beverages. Carbonation must also be considered. To provide adequate sealing/opening functionality, many existing products employ complex mechanisms with several parts. Multiple parts can increase manufacturing expense, and can make the product difficult and frustrating to use and clean.

BRIEF DESCRIPTION OF THE DRAWINGS

FIG. 2 shows an exploded view of the container sealing assembly;

FIG. 3 shows a top view of the container sealing assembly;

FIGS. 4-5 show cross-sectional views of the container sealing assembly in an open configuration;

FIGS. 7-9 show different views of a unitary compliant sealing valve included in the container sealing assembly shown in FIG. 1;

FIGS. 10-11 show different views of a cap included in the container sealing assembly shown in FIG. 1;

FIGS. 1-14 are drawn approximately to scale, however other relative dimensions may be used if desired.

DETAILED DESCRIPTION

Figure 1:
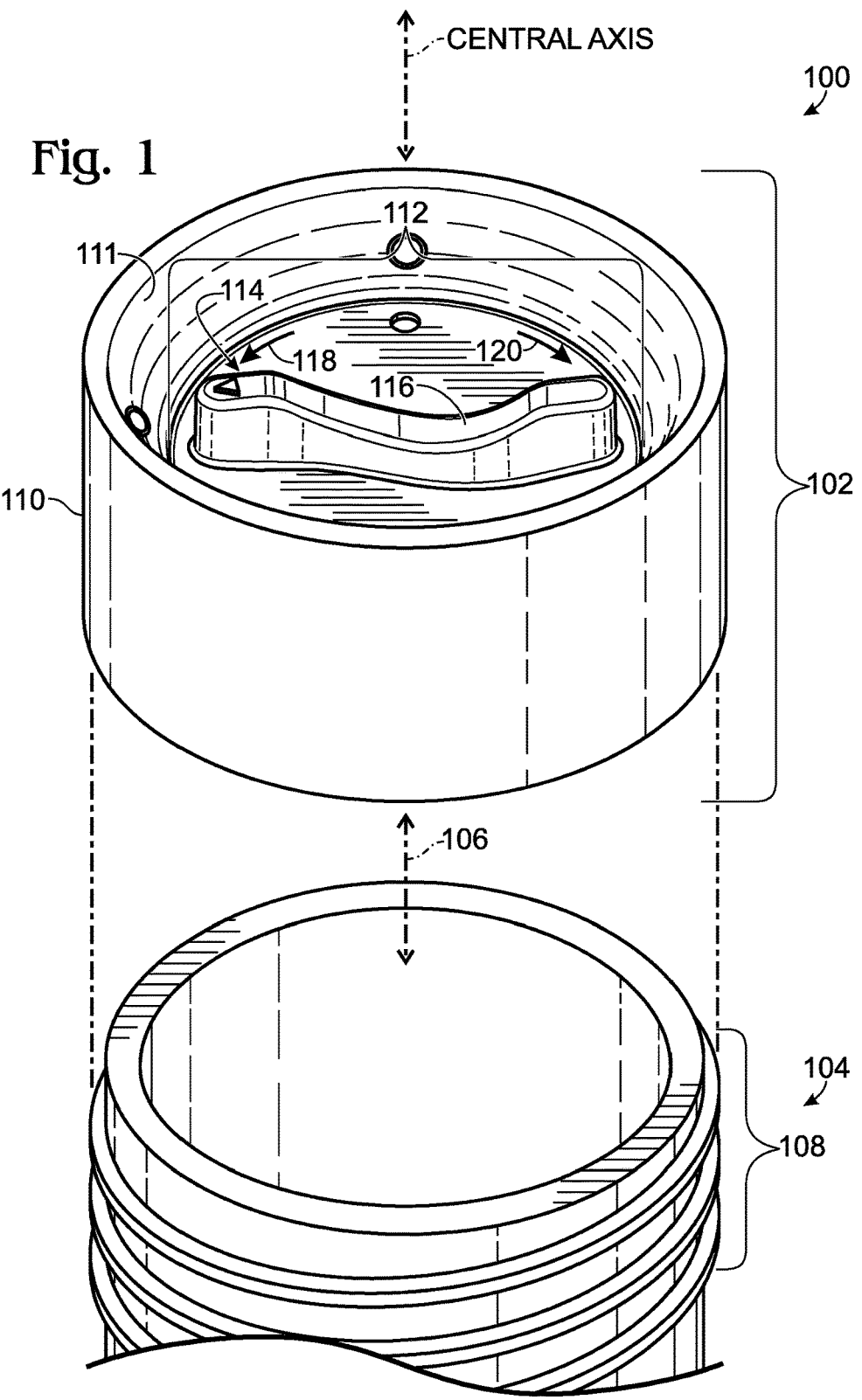
FIG. 1 shows a perspective view of a container including a container sealing assembly and a container body.

The present description contemplates various examples of a container sealing assembly configured to seal liquids within a container body. The container sealing assembly may be incorporated into a cap/lid, and employs a sealing valve. In typical embodiments, the sealing valve enables multiple functions to be converged into a single unitary member. FIG. 7 depicts an example of such a sealing valve (sealing valve 200) removed from the sealing assembly. Among other beneficial features, the sealing valve includes a compliant cap sealing section 408 configured to form a sealing interface with another portion of the sealing assembly. Interaction of the sealing valve with other structures causes this sealing interface to be extremely effective across a wide temperature/pressure range. Cooperating structures prevent the seal from being defeated accidentally, while at the same time allowing the user to easily unseal the product only when intending to do so.

In the examples described herein, rotation of a portion of the cap causes the sealing valve to translate upward and downward between an open position and a closed/sealed position. The sealing valve 200 can also include a compression spring section 604, configured to provide a restoring force that opposes closing/sealing forces. This spring force thus works together with pressure within the container (e.g., from temperature/carbonation) to defeat the seal. The sealing assembly is configured, however, so that the sealing force overcomes spring/temperature/carbonation force, within a reasonable pressure range (i.e., the sealing assembly may be specifically designed to fail before dangerous pressures are reached). In any event, the compression spring section typically is implemented to provide an assisting force as the user is opening the product. This helps the seal to be easily defeated (but only when that is intended), and can provide a haptic/tactile feel to the product that may be pleasing and positively influence quality perceptions. Also, incorporating spring and sealing functionality into a single unitary member can reduce manufacturing costs and simplify disassembly/reassembly (e.g., during cleaning).

The sealing valve may further include a shaft sealing section 400, in some cases referred to as providing the functionality of an o-ring. In particular, the examples herein employ a central shaft extending through the sealing valve and which, together with other components, rotates as the user manipulates the product between the open and sealed positions. Specifically, this rotation causes the sealing valve to move up and down. The o-ring functionality is provided in a central portion of the sealing valve to prevent liquid from escaping through the center of the sealing valve along the central shaft.

The sealing valve may also include seal-breaking protrusions 614 configured to assist in breaking the seal when the user opens the container lid. The seal-breaking functionality of these protrusions provide a further assist (i.e., in addition to the spring mentioned above) to easily and quickly break the seal when the product is opened. Also, in many cases, these seal-defeating structures will positively affect how the opening process feels to the user.

FIG. 1 depicts an example container 100 configured to store liquids or other contents in a sealed configuration and dispense contents in an open configuration. The container 100 includes a container sealing assembly 102 configured to attach to a container body 104, indicated via arrow 106. Threads 108 are provided in the container body 104 to enable the container body 104 to removably attach to corresponding threads (shown and described in greater detail with regard to FIGS. 4 and 10) in the container sealing assembly 102. However, additional or alternative coupling structures/mechanisms may be used while still providing the needed sealing. As depicted, container sealing assembly 102 may also include a cap 110 having a lip 111. Lip 111 may be contoured/shaped in various ways to favorably affect flow of the dispensed liquid when drinking.

The container sealing assembly 102 may further include a position adjustment member 112 mated with the cap 110. The position adjustment member 112 includes an upper portion 114 positioned vertically above part of the cap 110. The upper portion 114 includes a rotation handle 116 enabling a user to rotate the position adjustment member 112 about a central axis. The central axis may be aligned with a vertical axis when the assembly is arranged on a level surface. Additionally, the rotation handle 116 may be sized and/or shaped to be easily grasped by the user. In the depicted example, rotation of the position adjustment member 112 in a first direction 118 (e.g., opening direction) shifts the position adjustment member into an open position. Opposite rotation (direction 120) shifts the assembly into the sealed/closed position. Specifically, in the depicted examples, the rotations causes upward and downward translation of a unitary compliant sealing valve positioned underneath the cap. In the fully upward position, the translated sealing valve is pressed and seals against the underside of the cap. Downward translation from this position breaks the seal. In the depicted example, the opening and closing range 0-90 degrees of rotation. However, other rotational ranges may be used such as 0-180 degrees.

FIG. 2 shows an exploded view of container sealing assembly 102 which, in the present depiction, includes position adjustment member 112, cap 110, a sealing valve 200, and a removable fastener 204. A container seal 202 (e.g., a silicone ring gasket) may be included in the cap 110. The container seal 202 is configured to contact a lip of the container body 104, shown in FIG. 1, to provide a tight seal. When the container sealing assembly 102 is assembled, and during use, the position adjustment member 112, unitary compliant sealing valve 200, and removable fastener 204 rotate and translate together in unison.

As illustrated in FIG. 2, the unitary compliant sealing valve 200 has a continuous shape allowing the sealing valve to provide a sealing barrier to contents (e.g., liquids) in the container. Moreover, forming the unitary compliant sealing valve in a continuous shape can also simplify manufacturing of the sealing valve, thereby reducing valve manufacturing costs.

Typically, sealing valve 200 will have a greater elasticity than cap 110. Elasticity as defined herein is the ability of an object or material to resume its normal shape after being stretched or compressed. The unitary compliant sealing valve 200 can therefore conform to sealing surfaces in the cap to provide a strong seal. Specifically, in one example, sealing valve 200 may be silicone and cap 110 may be formed from a harder polymer (e.g., Polypropylene, such as a high temperature Polypropylene), metal, etc. Position adjustment member 112 typically will also be less resiliently deformable than sealing valve 200.

When the product is assembled, a central shaft 206 of the position adjustment member 112 extends through openings in cap 110, sealing valve 200, and removable fastener 204. When assembled in this manner, the container sealing assembly 102 can provide various closing and opening features, described in greater detail herein.

FIG. 3 shows a top view of the container sealing assembly 102 with the position adjustment member 112 in the open position. As illustrated, the position adjustment member 112 and the cap 110 each include openings 300 which align when the position adjustment member 112 is in the open position, enabling liquids to flow out of the container. The openings 300 may be curved or shaped in any appropriate way to cause liquids to favorably flow out of the container. FIG. 3 also shows the cutting planes defining the cross-sections shown in FIGS. 4-5.

FIG. 4 shows a first cross-sectional view of the container sealing assembly 102 in the open position. The cap 110 includes a threaded section 401 configured to attach to the threads 108 in the container body 104, shown in FIG. 1.

Sealing valve 200 includes a shaft sealing section 400 circumferentially surrounding the central shaft 206. The shaft sealing section 400 may be stretched to a larger diameter when mounted on the central shaft 206. The elasticity of the valve produces a shaft sealing force 402 exerted on the central shaft 206 by the shaft sealing section 400. The shaft sealing force 402 is directed radially inward towards the central shaft 206 to tightly seal the central shaft 206 and prevent liquids from passing through the opening along the central shaft. In the present example, shaft sealing section 400 extends into a groove 404 in the central shaft 206, though other sealing interfaces may be employed, including interfaces without grooves.

As indicated, cap 110 may include a sealing rib 406. As described herein, the sealing rib 406 may be any structure on the underside of the cap that provides a surface for sealing. In the present example, the rib takes the form of a cylindrical ring extending away from a bottom surface of the cap. In the open position, a portion of a cap sealing section 408 on sealing valve 200 is spaced away from the sealing rib 406. In the depicted example, another portion of the cap sealing section 408 remains in contact with the sealing rib 406 in the open configuration. However, in other examples the entire cap sealing section 408 may be spaced away from the sealing rib 406 in the open configuration. The spacing allows liquid to flow around the outer edges of sealing valve 200 and through the openings 300, shown in FIG. 3. When the container is closed/sealed, sealing valve 200 contacts the sealing rib 406 to provide a strong sealing interface across the contemplated range of pressures.

Continuing with FIG. 4, the removable fastener 204 is shown attached to and circumferentially surrounding the central shaft 206. As discussed above, the removable fastener 204 may be attached to central shaft 206 so that they are fixed and rotate together during opening/closing. Additionally, an upper surface 410 of the removable fastener 204 may contact a lower surface 412 of sealing valve 200. As shown, the lower surface 412 is curved. Curving the lower surface can enable the sealing force generated by the sealing valve to increase as the pressure within the container increases. Accordingly, the sealing valve can act as a dynamic pressure seal, thereby increasing the strength of the seal in the sealing assembly.

In the present example, a portion of fastener 204 extends into a fastener groove 414 on central shaft 206. Inclusion of such a groove can enable the relative positions of removable fastener 204 and central shaft 206 to remain fixed with regard to one another. However, other removable fastener 204 attachment features have been contemplated.

Figure 5:
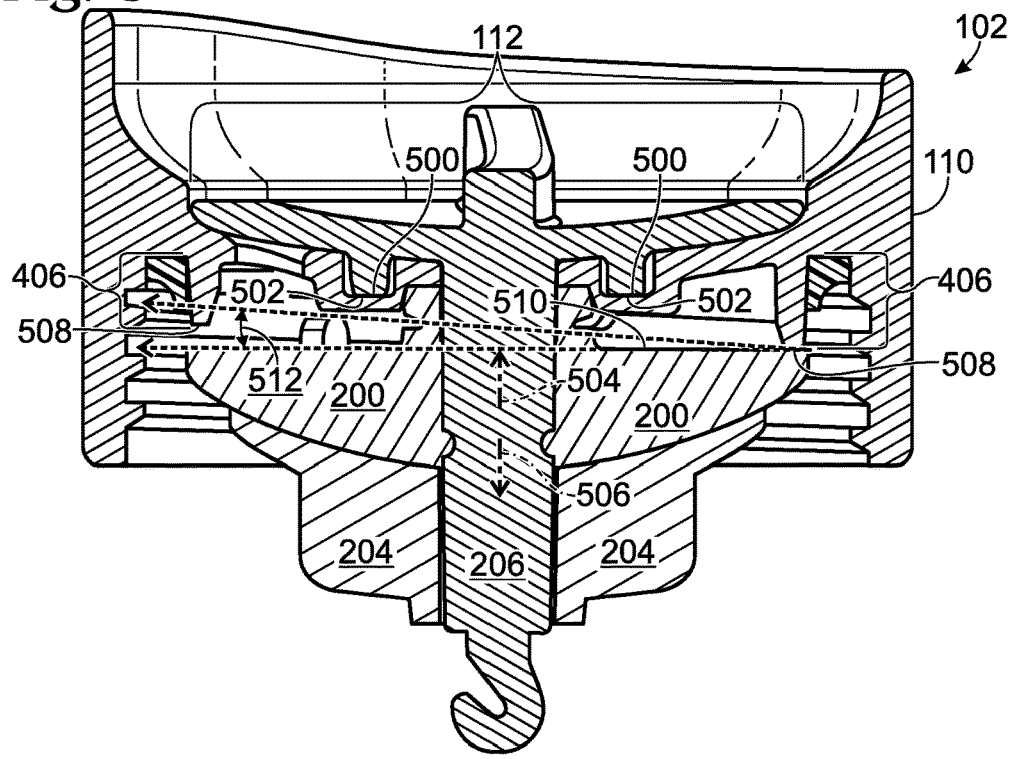

FIG. 5 shows another cross-sectional view of the container sealing assembly 102 in the open position. As illustrated in FIG. 5, cap 110 may include angled ramps 500, and position adjustment member 112 may include cams 502. Cams 502 are configured to interact with angled ramps 500 (i.e., cams slide along the ramps as the cap handle is rotated). In the depicted example, the angled ramps 500 are recessed into the cap 110, though other configurations may be employed. Ramps 500 may be contoured so that they provide haptic feedback when aligned in a fully closed and/or fully opened configuration, in one example. For instance, the angled ramps 500 may include small detents 1102, shown in FIG. 11, at each end of the ramps, so that cams 502 "snap" the rotating structure into the fully opened and closed positions.

Rotating position adjustment member 112 relative to cap 110 causes upward/downward translation of the central shaft 206 via the interaction between the cams 502 and the angled ramps 500. In turn, translation of the central shaft 206 causes the sealing valve 200 to move in an axial direction 504 towards the sealing rib 406 or an axial direction 506 away from the sealing rib.

Translation of the central shaft 206 in an upward direction, indicated at 504, will be referred to as the closing direction. Translation of the central shaft 206 in a downward direction, indicated at 506, will conversely be referred to as the opening direction. Closing the assembly causes removable fastener 204 to exert an upward force on sealing valve 200 as it is brought into contact with sealing rib 406.

Continuing with FIG. 5, it will be appreciated that a sealing surface 508 of the sealing rib 406 may be arranged at an off-axis angle 512 (e.g., biased angle) with regard to a horizontal axis 510. In the depicted example, the angle is 3°. However, other sealing rib 406 angles have been contemplated. For instance, the angle may be between 2°-5°, 5°-10°, 5°-15°, or 5°-20°.

Figure 6:
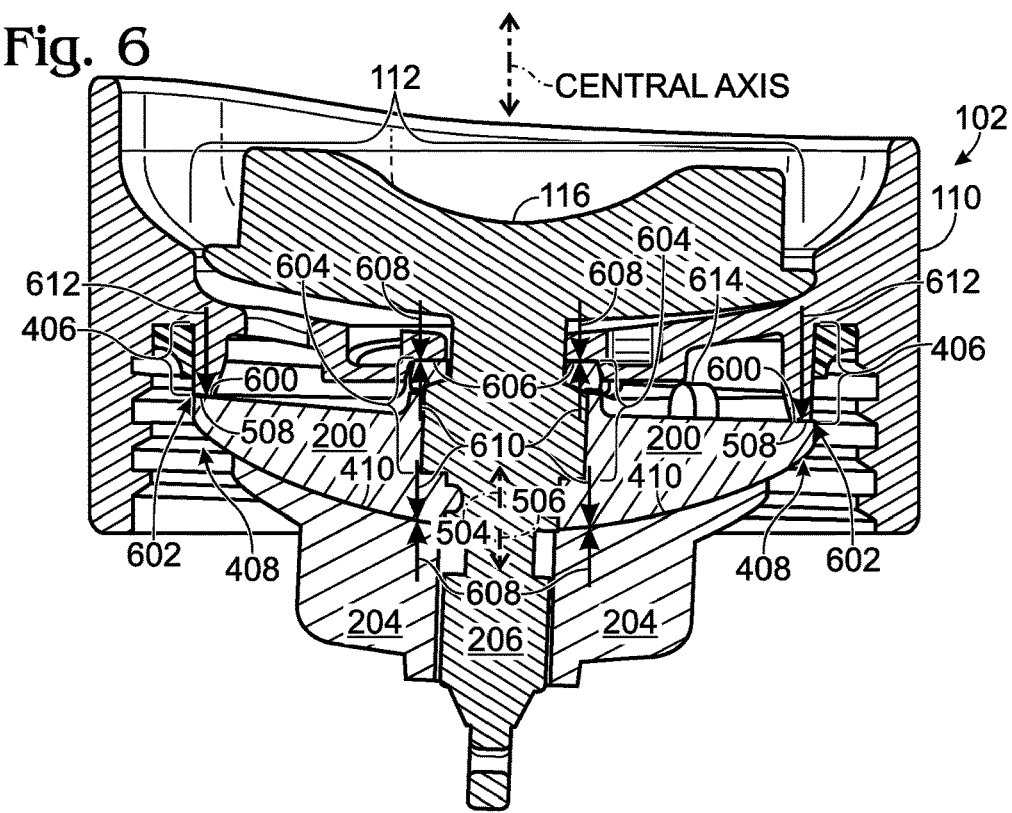
FIG. 6 shows a cross-sectional view of the container sealing assembly in a closed configuration.

FIG. 6 shows a cross-sectional view of the container sealing assembly 102 in the sealed position. As discussed above, the rotation handle 116 can be manipulated by the user to translate sealing valve 200 upward (direction 504) to seal the container. When sealed, a portion of the sealing valve 200 (i.e., a cap sealing surface 600 of the cap sealing section 408) is in contact with a portion of the cap 110 (i.e., the sealing surface 508 of rib 406). Specifically, a portion of the sealing valve (i.e., cap sealing section 408) may resiliently deform when contacting sealing rib 406 to provide a robust seal. Thus, a sealing interface 602 is formed between the sealing rib 406 and the cap sealing section 408 of the sealing valve 200 when the container sealing assembly 102 is in the sealed position.

Sealing interface 602 can provide both a negative and positive pressure seal, in some examples. For instance, sealing interface 602 may be designed to withstand pressures in the range between −3.5 pounds per square inch (PSI) and 22 PSI. Therefore, high pressure contents can be stored in the container as well as contents that cool and generate a negative pressure. Consequently, a wide variety of liquids can be tightly sealed within the container.

Sealing valve 200 also includes the compression spring section 604 briefly mentioned above. When sealing valve 200 is in the sealed position, the compression spring section 604 is compressed between compression surface 606 of cap 110 and upper surface 410 of removable fastener 204. Sealing causes a compressive force 608 to be exerted upon on the compression spring section 604.

In the closed position, the compression spring provides a restoring force 610. When the user opens the product, this provides an assist by urging the position adjustment member 112 in the axial direction 506 (downward). This enables the user to more easily open and unseal the container. The restoring force may also provide a pleasing "feel" as the product is moved between the open and closed positions.

As described above, the sealing surface 508 of the sealing rib 406 may be arranged off-axis from the horizontal axis. Therefore, when the unitary compliant sealing valve 200 contacts the sealing rib 406, the sealing rib pushes the unitary compliant sealing valve 200 into a corresponding off-axis position. The position adjustment member 112 and removable fastener 204 will also shift into an off-axis position due to being fixed to the sealing valve. The spacing between the central shaft 206 and a central opening 1100 in the cap 110 (FIG. 11) can provide sufficient slop/play to permit this axis shifting motion.

The unitary compliant sealing valve 200 includes seal-breaking protrusions 614, one of which is shown in FIG. 6. When the assembly is manipulated toward the open position from the closed position, the seal-breaking protrusion 614 is configured to, upon some initial rotation of the assembly, interact with a seal-breaking extension 1000 in the cap 110. In one example, the seal-breaking extension may be positioned so that it begins breaking the seal after the central shaft 206 is rotated by 10 degrees, 20 degrees, 30 degrees, etc., from the closed position. Typically, it will be desirable to have only a small amount of rotation before the structures break the seal.

Continuing with FIG. 6, the interaction between the seal-breaking protrusions 614 and the seal-breaking extension 1000 breaks the sealing interface formed between cap sealing section 408 and the sealing rib 406. It will be appreciated that this seal-breaking interaction not only opposes the compressive force 608 but also overcomes the static friction between the sealing rib 406 and the cap sealing section 408. In this way, the sealing assembly can be quickly broken to assist the user when opening the assembly.

FIGS. 7-9 show detailed views of unitary compliant sealing valve 200. FIG. 7 in particular is a perspective view of sealing valve 200 which depicts, among other things, both seal-breaking protrusions 614. As shown, seal-breaking protrusions 614 are positioned on an upper surface 700 of sealing valve 200, and extend upward away from the surface. As indicated, the seal-breaking protrusions may have a curved surface or other configuration that enables them to smoothly interact with portions of cap 110, specifically with a seal-breaking extension 1000, shown and described further with reference to FIG. 10.

In the present example, central shaft 206 of position adjustment member 112 is structured so that it is assembled to sealing valve 200 and removable fastener 204 in a "keyhole" manner. Specifically, the central shaft can only be received into sealing valve 200 when rotated into one of two different orientations relative to the sealing valve (180 degrees apart). In some cases, allowing for two such orientations permits more symmetry in the components and can simplify manufacturing. Related to this two-position keyhole arrangement, the two seal-breaking protrusions 614 are positioned on opposing sides of sealing valve 200. Accordingly, regardless of which keyhole orientation the product is assembled in, one of the protrusions 614 will be appropriately positioned to provide the seal-breaking function. The foregoing is but an example—any number of keyhole orientations and seal-breaking structures may be employed.

Continuing with FIG. 7, sealing valve 200 also includes a compression control undercut 706 in the compression spring section 604. The compression control undercut 706 enables the restoring force generated by the compression spring section to be tuned to achieve a desired magnitude (i.e., spring stiffness). For instance, the size, geometry, etc., of the compression control undercut 706 can be adjusted to tune stiffness. Sealing valve 200 also includes a valve body section 708 surrounding the compression spring section 604 and central opening through which the central shaft extends 206. The valve body section 708 extends between the compression spring section 604 and the cap sealing section 408 at the perimeter of the seal.

In the depicted example, cap sealing surface 600 included in the cap sealing section 408 has a planar geometry. However, in other examples the cap sealing surface 600 may have a recessed or raised character. The planar surface of cap sealing section 408, along with a corresponding surface on sealing rib 406, allows for a sufficiently large and robust sealing interface, and one that is not compromised by small relative changes in the "landed" position of the seal. Accordingly, the sealing rib and/or sealing valve can be manufactured with larger tolerances if appropriate/advisable in the context of the product and overall manufacturing process.

FIG. 7 also depicts an opening 710 through which the central shaft 206 (FIG. 6) extends when the product is fully assembled. Shaft sealing section 400 is shown in FIG. 7. As illustrated, the shaft sealing section 400 is positioned below the compression spring section 604. However, other positions of the shaft sealing section and the compression spring section have been contemplated. In some implementations, for example, the shaft sealing interface is at other depths on sealing valve 200 (i.e., lower or higher than the shaft seal of the depicted example).

FIG. 8 is a top view of sealing valve 200, showing, at a different perspective, various components already described. In particular, the view shows cap sealing section 408 and compression spring section 604. The figure also shows: (1) valve body section 708 forming the main expanse of the seal; and (2) the oppositely-disposed seal-breaking protrusions 614.

FIG. 9 is a bottom view of sealing valve 200. As discussed above, shaft sealing section 400 surrounds central shaft 206 of the position adjustment member 112 (FIGS. 2, 4-6 and 12). The section, via resilient deformation, exerts an inward radial force upon the central shaft to prevent liquid from passing through the hole in the center of sealing valve 200. Specifically, a shaft sealing surface 900 contacts an outer surface on the central shaft. The shaft sealing surface 900 may be contoured to mate with the groove 404 in the central shaft 206, shown in FIG. 12.

FIG. 10 shows a bottom view of cap 110. A threaded section 401 is provided for connecting the cap to container body 104 (FIG. 1). Seal-breaking extension 1000 is also shown. As previously discussed, seal-breaking extension 1000 interacts with one of the seal-breaking protrusions in the position adjustment member to break the seal. The seal-breaking extension 1000 includes an outer surface 1002 which may be curved, as depicted, or otherwise shaped/sized to smoothly interact with and slide past the seal-breaking protrusions 614 as the respective components are rotated. As depicted, seal-breaking extension 1000 extends away from a lower surface 1004 of the cap in an axial direction (e.g., downward direction when the container is arranged on a level surface). The previously-described sealing rib 406 of the cap is also shown. Additionally, the compression surface 606 is shown in FIG. 10. As previously discussed the compression surface 606 contacts and compresses the compression spring section 604 of the sealing valve 200, shown in FIGS. 5-8, when the assembly is sealed.

FIG. 11 shows a top perspective view of the cap 110. Angled ramps 500 are depicted, along with the detents 1102 that are formed in the ramps at each end. Detents 1102 provide a "seat" for cams 502 at the terminal points of rotation, providing a feel during use in which the cap "snaps" into the fully opened and closed positions. The higher-positioned detent is formed such that the cap handle reaches a maximum height just prior to dropping down into the upper detent (corresponding to the fully closed position). For example, the position adjustment member may be 0.1 mm higher at its highest point than when in the upper detent. This is but an example—numerous travel profiles of the position adjustment member have been contemplated. Compression spring section 604 (FIG. 7, etc.) typically is configured to provide at least some compression across the full range of rotation. In other words, a minimum level of compression is provided in the fully open state, with compression increasing as the cap is rotated toward the fully closed state. And as indicated above, compression levels may be tuned in some embodiments, and the compression spring in any case is configured to provide an assist as the cap is opened and the seal is broken.

FIG. 11 also depicts central opening 1100 in cap 110. The central shaft 206 of the position adjustment member 112 (FIG. 12) extends through the central opening 1100 when the product is assembled. It will be appreciated that the central opening 1100 may be sized to allow the central shaft 206 to shift off-axis in the closed position, as previously described.

Figure 12:
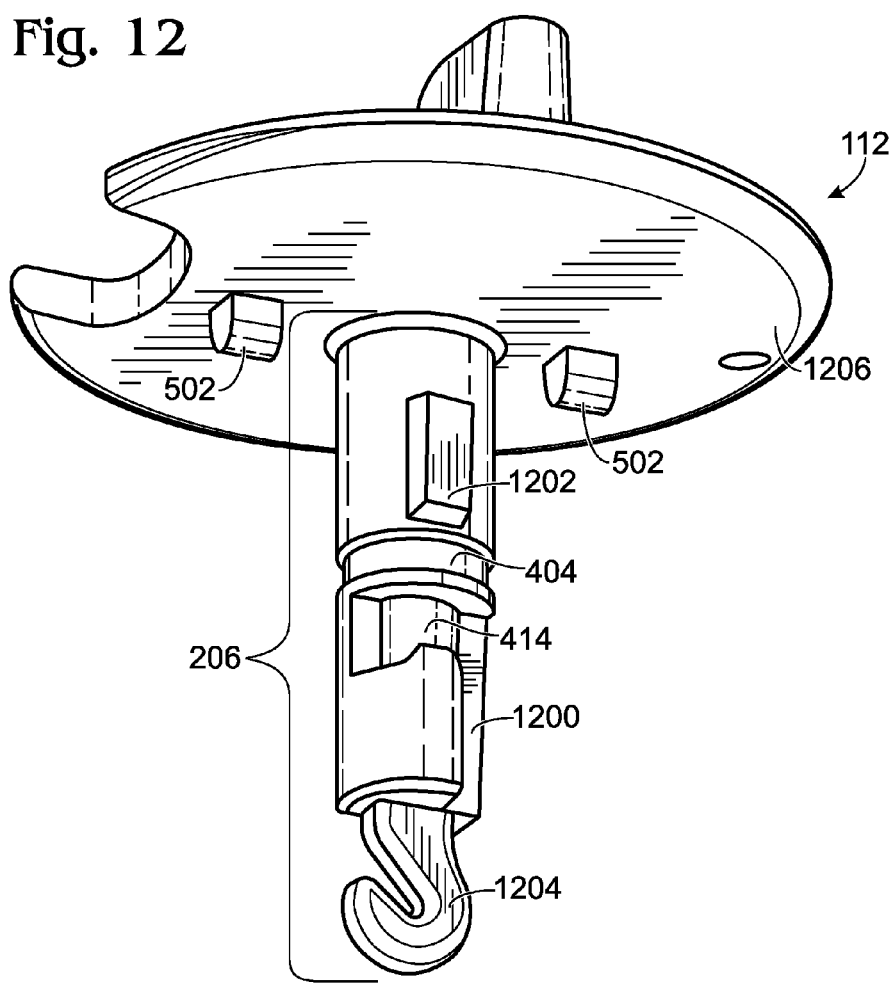
FIG. 12 shows a perspective view of a position adjustment member included in the container sealing assembly shown in FIG. 1.

FIG. 12 is an isometric view showing further detail of the position adjustment member 112. Central shaft 206 and cams 502 are depicted, among other features. As shown, the central shaft 206 includes a raceway 1200 enabling the removable fastener 204 (FIGS. 2-6 and 13) to be slid onto the central shaft 206. Once the removable fastener 204 is slid onto the raceway 1200, fastener 204 seats in fastener groove 414 to secure the fastener 204 on the central shaft.

Central shaft 206 includes rails 1202, one of which is depicted in the figure, to inhibit rotational movement of the sealing valve about central shaft 206. Rails 1202 also constrain the sealing valve's position so that it must be slid onto the central shaft 206 in a desired orientation. Additionally, it will be appreciated that the shaft sealing section 400 of the sealing valve (FIG. 9) is seated in the groove 404 when the sealing valve is attached to the central shaft 206.

A hook 1204 may also be provided to enable a tea bag or other steeping device to be hung from the central shaft 206. The figure also depicts a lower surface 1206 of position adjustment member 112. Typically, lower surface 1206 contacts or is closely spaced from cap 110 (FIG. 2) when the product is in an open configuration, and is spaced away from the cap when the product is in a closed configuration.

Figure 13:
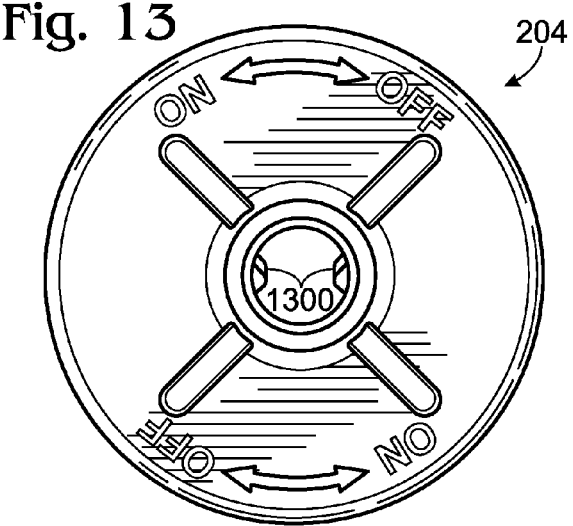
FIG. 13 shows a perspective view of a removable fastener included in the container sealing assembly shown in FIG. 1.

FIG. 13 shows a bottom view of the removable fastener 204. The removable fastener 204 includes extensions 1300 that mate with the fastener groove 414 (FIG. 12). The mating between the extensions 1300 and the fastener groove 414 enable the removable fastener 204 to be coupled to the central shaft 206. However, other coupling structures/mechanisms may be used to removably attach the fastener 204 to the central shaft 206.

Figure 14:
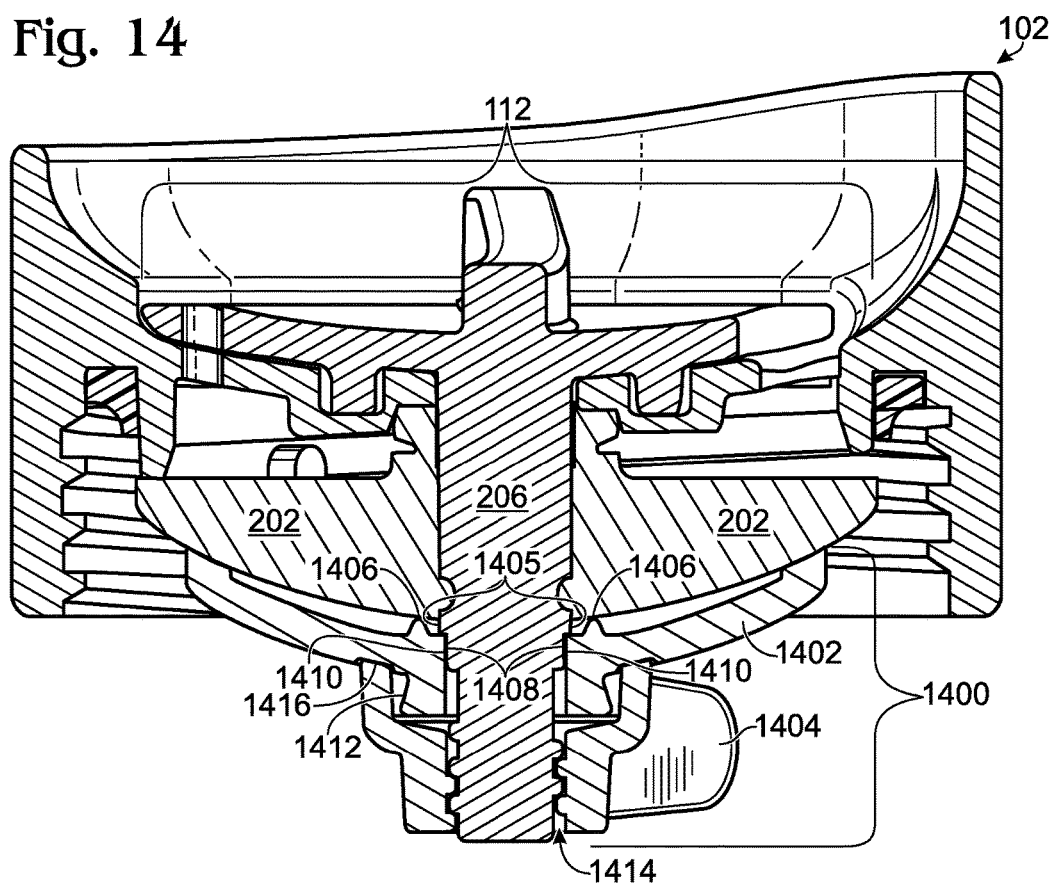
FIG. 14 shows another embodiment of the removable fastener included in the container sealing assembly.

FIG. 14 shows a cross-sectional view of another embodiment of a removable fastener 1400. The removable fastener 1400 is configured to enable a user to quickly and easily remove the fastener during disassembly. As depicted, the removable fastener 1400 includes a retainer 1402 and a nut piece 1404. The retainer 1402 is configured to slide onto the central shaft 206 of the position adjustment member 112 and contact sealing valve 200.

Hard stops 1405 may be included on the central shaft 206 to limit the axial movement of the removable fastener 1400. The retainer 1402 can also include a load protrusion 1406 configured to apply a load (e.g., small load) against the nut piece 1404 to support the sealing valve 200. The load applied by the load protrusion 1406 translates to the sprocket section 1416. In this way, tactile feedback indicating that the nut has been sufficiently tightened can be provided to the user. The retainer 1402 may include hexagonal surface 1408 for mating with hexagonal surfaces 1410 in the central shaft 206. The hexagonal mating provides a solid mechanical attachment between the central shaft 206 and the removable fastener 1400. The retainer 1402 may include an undercut section 1412 configured to provide grip when the nut piece 1404 is removed from the central shaft 206.

The nut piece 1404 is configured to attach to the central shaft 206 via a threaded interface 1414. Therefore, the nut piece and the central shaft 206 include mated threads. The threads in the removable fastener 1400 also enable the fastener to be easily and quickly removed for repair, cleaning, etc. Additionally, it will be appreciated that the threaded interface 1414 is not affected by the opening and closing operation in the assembly. In this way, the fastener and the central shaft will stay in desired relative positions during opening and closing operation. In one example, the thread pitch of the threaded interface 1414 may be 2.5 mm. However, other thread sizes, geometries, etc., have been contemplated.

The removable fastener 1400 also includes the sprocket section 1416 configured to contact the retainer 1402. It will be appreciated that the arrangement between the retainer 1402 and the nut piece 1404 reduces the likelihood of fluid flowing between the unitary compliant sealing valve 200 and the removable fastener 1400.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing or manufacturing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A container sealing assembly comprising:
    a cap configured to attach to a container body and including a sealing rib and a seal breaking extension; and
    a unitary compliant sealing valve movable between a sealed position and an open position, and including:
        (i) a cap sealing section; and
        (ii) a seal-breaking protrusion positioned on an upper surface of the unitary compliant sealing valve; wherein:
            the cap sealing section is configured to form a sealing interface with the sealing rib when both 1) the unitary compliant sealing valve is in the sealed position, and 2) the seal-breaking protrusion is not interacting with the seal-breaking extension; and
            the seal-breaking protrusion is configured to interact with the seal-breaking extension to break the sealing interface when the unitary compliant sealing valve is moved into the open position from the sealed position.

2. The container sealing assembly of claim 1, where the sealing interface provides a positive pressure seal and a negative pressure seal.

3. The container sealing assembly of claim 1, where an elasticity of the unitary compliant sealing valve is greater than an elasticity of the cap.

4. The container sealing assembly of claim 1, where the sealing rib is arranged at a biased angle with regard to a central axis of the container sealing assembly and exerts a biasing force on the unitary compliant sealing valve when the container sealing assembly is arranged in the sealed position.

5. The container sealing assembly of claim 1, where the unitary compliant sealing valve further includes a compression spring section configured to exert a restoring force on a position adjustment member when the unitary compliant sealing valve is in the sealed position, the restoring force opposing a compressive force exerted by the cap and the position adjustment member on the compression spring section, and the restoring force urging the position adjustment member in an axial direction to assist in moving the unitary compliant sealing valve into the open position.

6. A container sealing assembly comprising:
    a cap configured to attach to a container body;
    a unitary compliant sealing valve movable between a sealed position and an open position; and
    one or more seal-breaking structures; wherein:
        the unitary compliant sealing valve is configured to form a sealing interface with the cap when both 1) the unitary compliant sealing valve is in the sealed position, and 2) the one or more seal-breaking structures are not interacting;
        the one or more seal-breaking structures are configured to interact to break the sealing interface in response to a movement of the unitary compliant sealing valve from the open position to the closed position;
    the one or more seal-breaking structures include a seal-breaking protrusion of the unitary compliant sealing valve; and
    the seal-breaking protrusion is positioned on an upper surface of the unitary compliant sealing valve and extends upwards away from the upper surface.

7. The container sealing assembly of claim 6, where the movement of the unitary compliant sealing valve from the sealed position to the open position includes a rotation with regard to a central axis of the container sealing assembly.

8. The container sealing assembly of claim 7, where the rotation is a rotation by an angle of between 10 and 30 degrees with regard to the central axis of the container assembly.

9. The container sealing assembly of claim 6, where the seal-breaking protrusion has a curved surface.

10. The container sealing assembly of claim 6, where the seal-breaking structures further include a seal-breaking extension of the cap configured to interact with the seal-breaking protrusion of the unitary compliant sealing valve to break the sealing interface.

11. The container sealing assembly of claim 10, where the seal-breaking extension is positioned on a lower surface of the cap and extends downwards away from the lower surface.

12. The container sealing assembly of claim 10, where the seal-breaking extension has a curved surface configured so that the seal-breaking extension smoothly slides past a surface of the seal-breaking extension.

13. The container sealing assembly of claim 6, where the seal-breaking structures include two or more seal-breaking protrusions of the unitary compliant sealing valve, arranged with a rotationally symmetric spacing with regard to a central axis of the container sealing assembly.

14. The container sealing assembly of claim 6, where the unitary compliant sealing valve further includes a compression spring section configured to exert a restoring force on a position adjustment member when the unitary compliant sealing valve is in the sealed position, the restoring force opposing a compressive force exerted by the cap and the position adjustment member on the compression spring section, and the restoring force urging the position adjustment member in an axial direction to assist in moving the unitary compliant sealing valve into the open position.

15. A container sealing assembly comprising:
a cap configured to attach to a container body;
a unitary compliant sealing valve movable between a sealed position and an open position; and
one or more seal-breaking structures; wherein:
- the unitary compliant sealing valve is configured to form a sealing interface with the cap when both 1) the unitary compliant sealing valve is in the sealed position, and 2) the one or more seal-breaking structures are not interacting;
- the one or more seal-breaking structures are configured to interact to break the sealing interface in response to a movement of the unitary compliant sealing valve from the open position to the closed position;
- the one or more seal-breaking structures include a seal-breaking protrusion of the unitary compliant sealing valve and a seal-breaking extension of the cap configured to interact with the seal-breaking protrusion of the unitary compliant sealing valve to break the sealing interface; and
- the seal-breaking extension is positioned on a lower surface of the cap and extends downwards away from the lower surface.

16. The container sealing assembly of claim 15, wherein the seal-breaking protrusion is positioned on an upper surface of the unitary compliant sealing valve and extends upwards away from the upper surface.

17. The container sealing assembly of claim 15, wherein the unitary compliant sealing valve further includes a compression spring section configured to exert a restoring force on a position adjustment member when the unitary compliant sealing valve is in the sealed position, the restoring force opposing a compressive force exerted by the cap and the position adjustment member on the compression spring section, and the restoring force urging the position adjustment member in an axial direction to assist in moving the unitary compliant sealing valve into the open position.

18. The container sealing assembly of claim 17, wherein the compression spring section further includes a compression control undercut configured to control a magnitude of the restoring force generated by the compression spring section when the compression spring section is compressed when the unitary compliant sealing valve is in the sealed position.

19. The container sealing assembly of claim 17, wherein the compression spring exerts the restoring force throughout a range of movement of the unitary compliant sealing valve between the sealed position and the open position.

20. The container sealing assembly of claim 17, wherein the unitary compliant sealing valve further includes a cap sealing section and a valve body section surrounding the compression spring section and extending between the compression spring section and the cap sealing section.

* * * * *